(12) United States Patent
Logan et al.

(10) Patent No.: US 7,055,166 B1
(45) Date of Patent: May 30, 2006

(54) APPARATUS AND METHODS FOR BROADCAST MONITORING

(75) Inventors: James D. Logan, Windham, NH (US); Richard Goldhor, Belmont, MA (US); Daniel Goessling, Wayland, MA (US)

(73) Assignee: Gotuit Media Corp., Woburn, MA (US)

( * ) Notice: Subject to any disclaimer, the term of this patent is extended or adjusted under 35 U.S.C. 154(b) by 0 days.

(21) Appl. No.: 09/238,948

(22) Filed: Jan. 27, 1999

Related U.S. Application Data

(63) Continuation-in-part of application No. 08/723,641, filed on Oct. 3, 1996, now Pat. No. 5,892,536.

(51) Int. Cl.
*H04N 7/10* (2006.01)
*H04N 7/173* (2006.01)

(52) U.S. Cl. .......................... 725/32; 725/93; 725/114; 725/115; 725/145; 715/719; 715/720; 715/721; 715/722

(58) Field of Classification Search .................. 725/90, 725/93, 95, 114–118, 144–149, 87, 91, 135, 725/138; 715/719–721, 512, 810, 744–745, 715/772, 723
See application file for complete search history.

(56) References Cited

U.S. PATENT DOCUMENTS

| | | | |
|---|---|---|---|
| 3,810,156 A | 5/1974 | Goldman | |
| RE29,051 E | 11/1976 | Jones | |
| 4,023,456 A | 5/1977 | Groeschel | |
| 4,305,131 A | 12/1981 | Best ........................... 364/514 |
| 4,605,964 A * | 8/1986 | Chard ........................ 358/147 |
| 4,605,973 A * | 8/1986 | Von Kohorn ................ 358/335 |
| 4,811,325 A | 3/1989 | Sharples, Jr. et al. ......... 369/85 |
| 4,888,638 A * | 12/1989 | Bohn .......................... 725/34 |
| 4,918,730 A | 4/1990 | Schulze | |
| 4,931,950 A | 6/1990 | Isle et al. .................... 364/514 |
| 5,210,820 A | 5/1993 | Kenyon | |
| 5,307,456 A | 4/1994 | MacKay ..................... 395/154 |
| 5,319,455 A | 6/1994 | Hoarty et al. ............... 348/571 |
| 5,371,551 A | 12/1994 | Logan et al. ............... 348/571 |
| 5,485,219 A * | 1/1996 | Woo .......................... 348/460 |
| 5,485,518 A | 1/1996 | Hunter et al. | |
| 5,485,611 A | 1/1996 | Astle .......................... 395/600 |
| 5,526,284 A | 6/1996 | Mankovitz | |
| 5,541,638 A | 7/1996 | Story .......................... 348/13 |
| 5,557,541 A | 9/1996 | Schulhof et al. ............ 364/514 |
| 5,561,849 A | 10/1996 | Mankovitz ................... 455/45 |
| 5,572,442 A | 11/1996 | Schulhof et al. ............ 364/514 |
| 5,583,937 A | 12/1996 | Ulrich et al. ................. 380/20 |
| 5,592,511 A | 1/1997 | Schoen et al. .............. 375/220 |
| 5,668,917 A * | 9/1997 | Lewine ......................... 386/52 |
| 5,872,588 A * | 2/1999 | Aras et al. ...................... 348/1 |
| 5,892,536 A * | 4/1999 | Logan et al. ................. 348/13 |
| 6,005,565 A * | 12/1999 | Legall et al. ................ 345/327 |
| 6,006,257 A * | 12/1999 | Slezak ........................ 725/110 |
| 6,081,830 A * | 6/2000 | Schindler .................... 709/204 |

(Continued)

*Primary Examiner*—Christopher Grant
*Assistant Examiner*—Son P Huynh
(74) *Attorney, Agent, or Firm*—Kent A. Lembke; Hogan & Hartson L.L.P.

(57) ABSTRACT

Disclosed herein are systems and methods for editing the content of a broadcast programming signal to provide a proprietary program signal that has been tailored to the preferences of an individual monitoring the broadcast programming signal. Accordingly, the systems and methods of the invention offer computer-integrated television monitoring.

47 Claims, 6 Drawing Sheets

U.S. PATENT DOCUMENTS 6,160,989 A * 12/2000 Hendricks et al. ............ 725/36
6,172,677 B1 * 1/2001 Stautner et al. ............. 345/352
6,637,032 B1 * 10/2003 Feinleib ...................... 725/110
2003/0088872 A1 * 5/2003 Maissel et al. ............... 725/46

* cited by examiner

APPARATUS AND METHODS FOR BROADCAST MONITORING

CROSS-REFERENCE TO RELATED CASE

This is a continuation-in-part of U.S. Pat. No. 5,892,536 which issued on Apr. 6, 1999 from U.S. patent application Ser. No. 08/723,641 filed Oct. 3, 1996.

FIELD OF THE INVENTION

The invention relates to systems and methods for monitoring broadcast programming and, more particularly, to systems and methods that can integrate broadcast programming signals with selected additional programming signals, and that can further edit the integrated signals to provide a user with a proprietary program signal.

BACKGROUND OF THE INVENTION

Today, broadcast programming is recognized as a successful method of mass information delivery. As is generally known, broadcast programming systems typically include both a production facility and a network of transmission facilities. The production facility provides programs, such as television programs and radio programs, and the network of transmission facilities broadcasts the programs to the general population. This process has been remarkably successful at providing information and entertainment to the mass markets.

Unfortunately, the scale and expense of broadcast programming systems dictates that there will be few such systems available to the general public. Accordingly, at any given time, there are only a limited number of programs from which the general public can select. As a consequence, successful programming tends to cater to universal tastes and demands. This leaves unsatisfied the market's demand for programming that is more tailored to the individual audience member. In response to this demand, smaller production companies have come forward to develop and broadcast radio and television programs that are more directed to select segments of the media market. In particular, cable television carriers provide a plethora of programming choices, each of which is tailored to a particular segment of the media market.

Although these alternative broadcasting systems provide a wider selection of information and entertainment programming, they still are directed to relatively large portions of the media market and more troublesome, lack the budgets and talent pools of larger broadcasting systems that enable the larger broadcasting systems to continually provide high quality programming.

Accordingly, it is one object of the invention to provide systems and methods that provide computer-enhanced monitoring of broadcast programming.

It is further object of the invention to provide a system that provides programming that is more tailored to individual audience members.

It is another object of the present invention to provide systems that allow an audience member to selectively control characteristics of a programming sequence being monitored.

It is still a further object of the present invention to provide systems and methods of an audience member to interact with a program sequence being monitored.

Still further objects of the invention will become apparent upon review of the illustrated embodiments and upon reading the following description in conjunction therewith.

SUMMARY OF THE INVENTION

The invention provides systems and methods for editing the content of a broadcast programming signal to provide a proprietary program signal that has been tailored to the preferences of an individual monitoring the broadcast programming signal. The editor of the broadcast programming signal may be the user of the system, a broadcaster, or any third party. The systems and methods of the invention offer computer-integrated video or audio monitoring.

The term "broadcast programming signal" as used herein will be understood to encompass, but not be limited to, television programs, including satellite television and cable television programs, radio programs, Internet broadcast programs, or any other type of program that is transmitted for reception by an audience. This term also includes programming content that is already stored and that could be viewed at any time, such as Internet downloads or other forms of video-on-demand, as well as material stored on digital video disc (DVD), compact disc (CD), or video tape and distributed physically through stores or the mail.

In one aspect, the invention provides apparatus for generating a proprietary program signal that includes a monitor for receiving and monitoring the broadcast programming signal, an editing unit for generating, as a function of the broadcast programming signal, a marking signal representative of information for modifying the broadcast programming signal, a first communication system for transmitting the marking signal, a receiver for receiving the broadcast programming signal, a buffer coupled to the receiver for storing the broadcast programming signal, a second communication system for receiving the marking signal, and a processor coupled to the buffer and second communication system for modifying the broadcast programming signal in response to the marking signal. In an alternative embodiment, the buffer is a disc or tape containing previously stored broadcast program content. A user would match the marking signals received from the first communication system against the buffered broadcast program content in order to modify the program. In the case of Internet downloads or other forms of video-on-demand, the buffer is a commonly shared server, which "dishes" out the broadcast program content on demand.

The apparatus of the invention may also include a marking interface coupled to the processor for receiving input signals representative of user-generated instructions for selection of a marking signal for use in modifying the broadcast programming signal. A receiver of an apparatus of the invention may have one or more than one tuner. A receiver with more than one tuner can receive, and place in the buffer, multiple broadcast programming signals at once. A communication system of the invention may also include a receiver capable of receiving a marking signal that is also transmitted in the form of a component of the broadcast programming signal. Alternatively, the marking signal may be transmitted separately, either by the broadcaster or the editing unit, as a point-to-point transmission signal, such as a cellular telephone transmission, for example. In one embodiment, a marking signal may include information for modifying the broadcast programming signal so that the portion of the broadcast programming signal marked by the marking signal cannot be deleted, or so that the portion of the broadcast programming signal marked by the marking signal must be viewed or listened to for a specified period of time before the user can proceed to another marked portion of the broadcast programming signal.

An apparatus of the invention may also include a data interface for coupling to a source of computer-readable data, which is representative of information suitable for viewing on a television or video monitor. This computer-readable data includes a menu of program segments, each corresponding to a particular marking signal. The computer-readable data may also include program segment information, such as a summary, the total length of the broadcast programming signal, the length of the program segment, quality rating of the program segment, number of, and type of or identity of, previous viewers of the program segment, identification of the person monitoring and marking the program, feedback from other viewers or listeners who have already seen or heard the program, etc. Such feedback from viewers or listeners may be in the form of explicit commentary purposely supplied through means such as a keyboard, or buttons which express approval or disapproval, and communicated to the editing station, where it is then processed and redistributed to other viewers in the form of computer-readable information. In addition, the feedback could comprise the sequence of "surfing" actions taken by the viewer as the content was viewed. Thus the program segment information may include which segments a particular user skipped over or viewed twice, etc. This implicitly obtained information may be gathered at the editing station, where it is then processed and redistributed to other viewers in the form of computer-readable data.

A processor in this embodiment of the invention is coupled to the data interface and determines the time remaining in a program segment or a total broadcast programming signal based on this program segment information. The processor then generates a time remaining signal, which can be used to display to the user the time remaining in the total broadcast programming signal or in a particular program segment. The processor also shows a graphical representation of each time segment of the program being viewed and how many previous viewers watched each segment.

In an alternative embodiment, a communication system of the invention is adapted for receiving a data signal that represents computer-readable information, and wherein the processor of the apparatus includes an integrator capable of generating a composite program signal as a function of the broadcast programming signal and the data signal. The integrator can be an electrical circuit card assembly or a software module or any other device capable of combining plural signals. In this embodiment, the sub-carrier system can include an Internet communication system, such as a telecommunication interface that includes a modem, that receives video data, audio data, e-mail, or any other type of data capable of being exchanged over the Internet.

In another embodiment, a processor for use in an apparatus of the invention may include a selection control program, which generates a signal based on user-specified program selections. The generated signal directs the receiver to receive and the buffer to store user-specified broadcast programming signals. In this embodiment, the user may select a specific broadcast program for storing in the buffer. Alternatively, the user may select a schedule for receiving and storing of a first set of broadcast programming signals. Finally, the selection control program may be used to monitor user-specified program selections and generate a program selection signal representative of the user-specified program selections. The selection control program may then direct the apparatus to receive and store a second set of broadcast programming signals in response to the program selection signal.

In a further embodiment, the processor can include an audio filter for removing audio information from the broadcast programming signal to generate an audio-filtered signal. For example, a system according to the invention can include an audio filter for removing an audio track of a television program to generate an audio-filtered signal that represents the video portion of the television program without the accompanying audio track. In this embodiment, the system can also include an audio generator for generating, responsive to the marking signal, an audio signal representative of a track of audio and for integrating it with the audio-filtered signal. Accordingly, a system according to this embodiment of the invention can remove the audio track of a television program and replace it with an alternative audio track that can be broadcast from an alternative source and selected by the user for dubbing over the original audio track.

In a further embodiment, the processor includes a selection controller for providing user-selectable edit signals representative of instructions for modifying the broadcast programming signal. In this embodiment, the processor can also include a database memory for storing topic data signals representative of user-preferred topics, and the selection controller generates the edit signals in response thereto. Further, in this embodiment, the database memory can also include a storage device for storing a priority data signal that is representative of a priority level, typically a user selected interest level, associated with the topic data signal stored in the database. Similarly, in this embodiment, the processor can include a segment processor, responsive to the selection controller, for moving segments of the broadcast programming signal into an alternative order. The topic data signals or priority data signals may be stored at any location, but are preferably stored at the user's site.

Further, the processor may also include a viewing control program which monitors user viewing habits during viewing of a first broadcast programming signal and generates a topic data signal based on those viewing habits. Edit signals representative of instructions for modifying a second broadcast programming signal are then generated based on the topic data signals. The edit signals may provide instructions for selection of programs of a second broadcast programming signal to be recorded. The viewing control program may also monitor user viewing habits during a first broadcast programming signal and generate a priority data signal based on those viewing habits. The processor may also include a segment processor, which orders segments of second or later viewed broadcast programming signals according to the priority data signals. Finally, the viewing control program may generate a viewing log based on the viewing habits of the viewer.

In a further alternative embodiment of the invention, the system includes a database memory having storage for a segment identification signal that represents a known portion of a broadcast programming signal. Further, the system may include a segment filter coupled to the database memory for removing the known portion from the broadcast programming signal. Accordingly, in this embodiment, the system can include a database memory that stores a segment identification signal. The segment identification signal acts as a type of fingerprint for identifying a portion of a broadcast, such as the opening credits, an intervening commercial, or other such portion of a broadcast. The segment filter can identify that portion of the broadcast and remove that portion of the broadcast from the broadcast programming signal, thereby editing out that known portion of the broadcast programming signal. In this way, the system includes elements for generating or supplementing a marking signal.

In a further alternative embodiment, the system can include a communication system that has a transmitter for transmitting data signals to a remote site. In this alternative embodiment, an input device can couple to a communication system for receiving input signals typically generated by a user, and for providing the input signals to the communication system for transmission as data signals to the remote site. In this way, a user can enter information, such as user preferences, comments, or other such information, and transmit the entered information to the remote site.

In a further embodiment, the invention provides an apparatus for generating a proprietary program signal comprising a monitor capable of receiving and monitoring a broadcast programming signal, an editing unit for generating, responsive to the broadcast programming signal, a marking signal representative of the information for modifying the broadcast programming signal, and a communication system coupled to the editing unit for transmitting the marking signal to a remote site.

In a further embodiment, a broadcast programming signal stored in a buffer is synchronized with the marking signal(s) generated by a monitoring station, which includes a monitor for receiving and monitoring a broadcast programming signal, an editing unit for generating as a function of the broadcast programming signal, a marking signal representative of information for modifying the broadcast programming signal, and a first communication system coupled to the editing unit and adapted for transmitting the marking signal. A second communication system is located at the user's site and is adapted for transmitting a signal representative of a program identification system, such as numerical guides published in newspapers and TV guides, to the monitoring station. In this embodiment, marking signals generated by the editing unit and transmitted by the first communication system are associated with specific programs using the program identification system and contain a time notation relative to a program segment. This time notation may be either a time notation relative to a beginning of a program segment of a broadcast programming signal, or it may be a time notation of an absolute time of a program segment of a broadcast programming signal. These marking signals are received by the second communication system. Program content stored in the buffer is also marked with a marker, which is representative of the time relative to the beginning of the recording of a program or the specific absolute time that the content was recorded. A processor at the user station applies the marking signals to the same location in the program content stream based on the times associated with the marking signal and those associated with the stored program content. The processor also contains information on the respective time zones of the user and the monitoring station and makes adjustments accordingly if there are time differences in the user's and monitoring station's system clocks.

In a still further embodiment, the invention provides an apparatus for generating a proprietary program signal comprising a casting station for generating and transmitting a marking signal. The casting station can have a monitor capable of monitoring a broadcast programming signal, an editing unit for generating as a function of the broadcast signal, a marking signal representative of information for modifying the broadcast programming signal, a communication system coupled to the editing unit for transmitting the marking signal to a remote site, and a receiving station having a receiver capable of receiving said broadcast programming signal, a buffer, coupled to the receiver, and having storage for data signals representative of a portion of the broadcast programming signal, a communication system capable of receiving the marking signal that is representative of instruction for modifying the broadcast programming signal, and a processor coupled to the communication system and the buffer and responsive to the marking signal for modifying the broadcast programming signal to generate the proprietary programming signal.

In another embodiment, the invention provides apparatus for generating a proprietary program signal that includes a receiver capable of receiving a broadcast programming signal, a marking interface for receiving a marking signal representative of information for modifying the broadcast programming signal, a data interface for coupling to a source of computer-readable data being representative of information suitable for monitoring, including viewing or hearing, on a television or video monitor, and a splicing processor coupled to the marking interface and the data interface, and responsive to the marking signal for generating the proprietary program signal as a function of information representative of the broadcast programming signal and the computer-readable data. An apparatus of this embodiment can further include a local database that couples to the data interface and that has storage for the data signals that are representative of information suitable for monitoring on a television or video monitor, including viewing and hearing. Further, the data interface can couple to a communication system that receives data signals representative of information suitable for monitoring on a television monitor. Further, the apparatus can include a controller for directing the receiver to receive a select broadcast programming signal. For example, the controller can direct a conventional television receiver to select a particular television channel to receive the broadcast programming signal broadcast on the channel. In alternative embodiments, the controller can be a software module that couples to a TV card coupled to a computer system and that provides software control of the channel being received by that TV card. Other embodiments of the controller can be practiced with the present invention without departing from the scope thereof.

The invention can also include a marking interface that has an Internet communication system for receiving marking signals by Internet transmission. Further the marking interface can include a receiver for receiving input signals that are representative of user-generated remote control instructions. This receiver can be responsive to infrared, radio-frequency, keyboard, or any other type of data transmission, as well as voice recognition technology, suitable for allowing a user to provide input to the system.

In one further embodiment, the apparatus can include a signal processor that couples to the marking interface, for processing the broadcast programming signal to detect an occurrence of a pre-defined program segment and for generating the marking signal in response thereto. In one such embodiment, the system can also include an identification signal memory that couples to the signal processor and that has storage for a segment identification signal. The segment identification signal can provide characteristic information of a pre-defined program segment.

In another embodiment, an apparatus of the invention includes an editing unit for generating, as a function of a broadcast programming signal, a first marking signal. The first marking signal may include a blocking signal, which is representative of information either for preventing the deletion of a portion of the broadcast programming signal or for preventing the selection of a second marking signal until after a predefined segment of the broadcast programming signal has been viewed. The predefined segment of the broadcast programming signal can be any portion of the broadcast programming signal. In this embodiment, the apparatus of the invention further includes a first communication system for transmitting the marking signals, a receiver for receiving a broadcast programming signal, a buffer coupled to the receiver for storing the broadcast programming signal, a second communication system for receiving the marking signals and a processor coupled to the buffer and second communication system for modifying the broadcast programming signal in response to the marking signals. In still further embodiments, the apparatus may include a marking interface coupled to the processor for receiving input signals representative of user-generated instructions for the selection of a marking signal for use in modifying the broadcast programming signal.

DETAILED DESCRIPTION OF THE INVENTION

Figure 1:
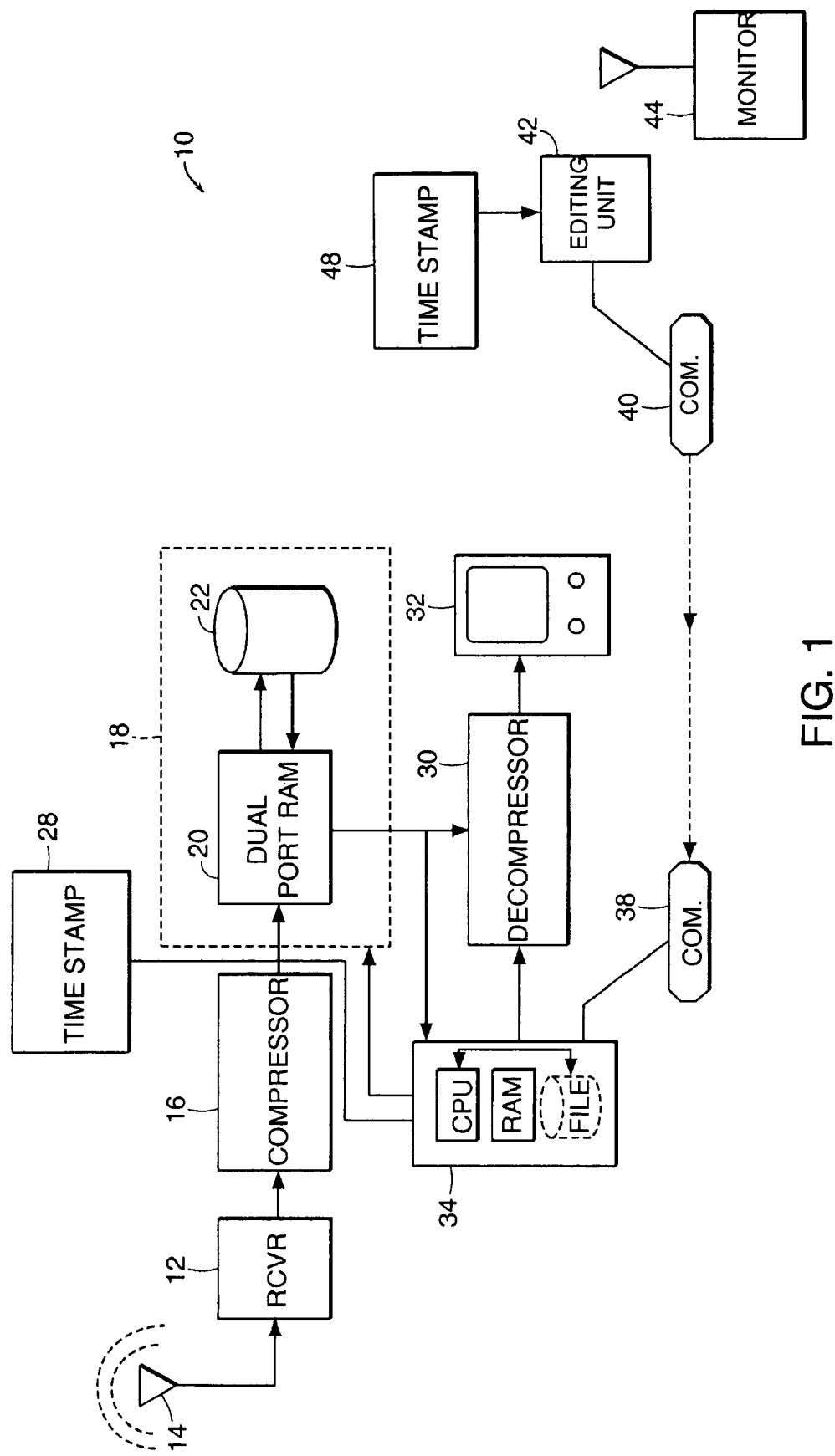
FIG. 1 is a functional block diagram of one embodiment of a system according to the invention.

FIG. 1 depicts a system 10 according to the invention for providing computer-enhanced broadcast monitoring. The system 10 depicted in FIG. 1 is a system for monitoring a video broadcast programming signal, such as a television program, and for editing the monitored program to generate a proprietary program signal having features and information tailored to the preferences of a particular audience member.

Although the system 10 depicted in FIG. 1 depicts a system for modifying a video broadcast programming signal, it will be apparent to one of ordinary skill in the art of communications engineering that alternative embodiments for modifying audio broadcast programming signals, such as radio programs, as well as other broadcast signals, follow from the invention as described herein.

The illustrated system 10 includes a receiver 12, an antenna 14, a compressor 16, a memory system 18, a dual port ram 20, a persistent memory device 22, a time stamp unit 28, a decompressor 30, a video monitor 32, a processor 34, a local communication system 38, a remote communication system 40, an editing unit 42, a remote time stamp 48, and a monitor 44.

The depicted receiver unit 12 couples to the antenna 14 to receive a broadcast programming signal. A broadcast programming signal includes television programs, including traditional broadcast television, satellite television and cable television programs, radio programs, Internet broadcast programs, or any other type of program that is transmitted for reception by an audience. This term also includes programming content that is already stored and that could be viewed at any time, such as Internet downloads or other forms of video-on-demand, as well as material stored on DVD, CD, or video tape and distributed physically through stores or the mail. In the case of Internet downloads, or other forms of video-on-demand, there is no local storage of content. The storage takes place at a commonly-shared server, which then "dishes" out the content on demand. Typically, these systems allow the user to fast forward, pause, etc., using local controls. A marking signal of the invention is used to personalize such server-stored content in the same manner as it is used to personalize locally-stored content. The marking signal allows a user to personalize server-stored content by using the supplied marking signal in conjunction with the local controls supplied by the video-on-demand service provider.

In one embodiment, the receiver 12 is a conventional television tuner capable of receiving broadcast television signals. In alternative embodiments, the receiver 12 can be a cable receiver, a satellite receiver, a computer network interface, or any other type of receiver capable of receiving a signal. In a still further alternative embodiment, the receiver 12 can have more than one tuner for receiving multiple broadcast programming signals simultaneously. In this embodiment, a program may be buffered in compressor 16 simultaneously with one or more other programs. The tuners of this embodiment may include, for example, several tuner circuits built into a single computer card, multiple single tuner cards, tuner circuitry built into other components of the user's computer system (i.e., the motherboard), or it may include connections to receive input from external tuners that were originally used for other purposes, such as the tuner for a television or VCR, for example. Each separate tuner may be connected to different programming sources, such as satellite TV, cable TV, radio broadcasts, Internet broadcasts, etc. For illustrative convenience, the receiver 14 is shown as a receiver for radio frequency (RF) signals.

As depicted in FIG. 1, the receiver 12 couples via a transmission path to the compressor 16. The depicted compressor 16 converts the received programming signal into a compressed digital format suitable for storing in a digital memory system, such as the depicted memory system 18. Optionally, the compressor 16 is an electrical circuit card assembly (CCA) that includes a video encoder/decoder (CODEC) chip set, which supports the H.261 video communication standard or the multi-media standards Motion Picture Expert Group (MPEG) and Joint Photographers Expert Group (JPEG). Moreover, the compressor 16 can employ an MPEG compression system for compressing motion video and audio. The design and implementation of the compressor 16 follows from principles well known in the art of computer and video engineering, which are described in the publication Keith Jack, Video Demystified: A Handbook for the Digital Engineer (1993).

The depicted memory system 18 acts as a buffer memory for storing a compressed video signal generated by the compressor 16. The depicted memory system 18 has a high-speed random access electronic memory 20 depicted as a dual-port ram, and a slower persistent memory 22 depicted in FIG. 1 as a high capacity magnetic disc drive system. One such memory system 18 is described in U.S. Pat. No. 5,371,551 issued to Logan, et al., the teachings of which are herein incorporated by reference.

FIG. 1 further depicts a time stamp 28. The time stamp 28 can be an electrical circuit card assembly having a clock element thereon that generates at time-spaced intervals a time stamp signal that represents a computer readable periodic time reference. As depicted in FIG. 1, the time stamp 28 is multiplexed onto the transmission path employed by the compressor 16 for providing a compressed program signal to the memory system 18. In a preferred embodiment, the time stamp 28 generates a time stamp at set intervals, such as every five seconds, and the time stamp is multiplexed with the compressed broadcast signal and the multiplexed signal is stored by memory system 18. Accordingly, the time stamp 28 provides a time based index into the compressed programming data stored in the memory system 18.

The depicted decompressor 30 couples via a transmission path to the memory system 18 and can receive the stored compressed programming data. The decompressor 30 can be an electrical circuit card assembly that includes a CODEC chip set that implements the MPEG decoding process for decompressing MPEG motion video into a format suitable for display on a conventional video monitor, such as the video monitor 32 depicted in FIG. 1. The design and implementation of the decompressor 30 follows from principles well known in the art of computer and video engineering, which are described in Keith Jack, Video Demystified: A Handbook for the Digital Engineer (1993).

The depicted processor 34 is a digital data processor that can process the compressed programming signal to modify the compressed programming signal, and thereby generate a proprietary program signal, which can be stored in the memory system 18. In a preferred embodiment, the processor 34 is a personal computer system, such as an IBM PC compatible personal computer of the type that conventionally includes a central processing unit (CPU), a file storage memory, and a program memory. In another alternative embodiment, the processor 34 is a set-top box that includes a tuner, CPU, file storage memory, and a program memory. The depicted processing unit 34 couples via a first transmission path to the input of the memory system 18 and couples via a second transmission path to the output of the memory system 18. As further depicted, the processor 34 can provide a control signal via a third transmission path to the memory system 18 for controlling memory access to the memory system 18. The processor 34 can further connect to the decompressing unit 30 and to a communication system 38.

The communication system 38 can be any communication system suitable for receiving computer readable data from a remote site. In one embodiment, the communication system 38 includes a telecommunication system, such as a modem, that connects via the public switching telephone network (PSTN) to a remote site. In one such embodiment, the communication system 38 is an Internet compliant data link that operates under the control of a computer process running on the processor 34 to connect the processor 34 to the Internet computer network. In another alternative embodiment, the communication system 38 may include a receiver capable of receiving a broadcasted marking signal. Such a broadcast may use bandwidths available from sources such as FM band sub-carriers or the vertical blanking channel of a TV broadcast. Likewise, communication system 38 may be capable of sending cellular telephone transmissions or communicating with the editing <unit 42> via other point-to-point communication devices. Such communication systems are well known, and any such system can be employed by the invention without departing from the scope thereof.

FIG. 1 further depicts a remote communication system 40, that can be any communication system suitable for transferring data to a remote location, and that can be similar to the communication system 38. The communication system 40 connects via a transmission path to the editing unit 42 that connects via a transmission path to the remote time stamp 48. The depicted monitor 44 can receive the same broadcast programming signal being received by the receiver 12. The editing unit 42 can generate, in response to the monitored broadcast programming signal, a marking signal that can provide instructions for modifying the broadcast programming signal.

The depicted monitor 44 can include an RF tuner for receiving the broadcast programming signal, which in this example is a television program. The monitor 44 can further include a video display element that can display to an operator at the editing unit 42 the television program being broadcast. In one embodiment, the monitor 44 is a conventional television receiver set that includes an RF tuner capable of receiving broadcast television programming signals, and a monitor element capable of displaying the television program being broadcast.

The editing unit 42 depicted in FIG. 1 can be an IBM PC compatible computer workstation that executes a computer program that configures the workstation into the depicted editing unit 42. In one embodiment, the editing unit 42 can provide to the operator an input device. The operator/editor can be the user of the system, the broadcaster of the content itself, or any third party. The operator employs the input device to create a marking signal that represents locations in the compressed programming signal stored in the memory system 18 that are associated with certain attributes of the content found before or after those locations. For example, an operator can generate a marking signal that represents a location in the content stream that denotes the beginning of a new news item in a news broadcast. The marking signal could also include text describing the content of the news segment to follow. The viewer of video monitor 32 can issue instructions such as ones to review the text summary, to jump to a particular location in the broadcast content, or delete the segment following the location denoted by the marking signal. In one embodiment, the operator enters a sequence that denotes the beginning of the portion of the compressed broadcast programming signal that the user may want to delete. The editing unit 42 detects the input sequence and reads a time signal from the time stamp 48 and stores in the editing unit 42 memory a time signal representative of the start-time of the deleteable portion of the programming signal. At a subsequent time, the operator enters a stop sequence that is detected by the editing unit 42. Similarly, the editing unit 42 reads the time stamp generated by the time stamp 48 and stores a stop signal in the editing unit memory. The editing unit 42 then generates, as a function of the start signal and stop signal, a marking signal that represents as a function of the time stamps, that portion of the broadcast programming signal that can be deleted. The editing unit 42 can transmit via the communication system 40 the marking signal to the communication <system> 38. The processor 34 can receive from the communication system 38 the marking signal. The processor 34 can determine the start time of the delete-able portion of the broadcast programming signal and can operate the memory system 18 to search for a time stamp proximate to the time stamp of the start time represented in the marking signal. The user, if so desired, can then instruct processor 34 to delete that portion of the stored compressed programming signal that is associated with time stamps having values between the start and stop times of the marking signal.

Accordingly, an operator at the editing unit 42 can monitor the video programming signal and enter an input sequence at select times, such as at the beginning and at the end of a sequence of commercials, and the editing unit 42 detects the input sequence and collects from the time stamp 48 the time stamps that indicate the beginning and the end of the commercial sequence. The processor 34 can then employ the time stamp information of the marking signal to edit from the stored compressed programming signal that portion of the stored compressed programming signal that represents the commercial sequence. The marking signal can include the start time of the commercial sequence and the length of time of the commercial sequence. Alternate marking signals can be generated to provide additional information concerning the broadcast programming signal to be used for selectively deleting the commercial sequence. Accordingly, the system 10 can remove from the captured broadcast programming signal a sequence of commercials that occurs intermittently within the broadcast programming signal.

In another embodiment, computer-readable data representative of a beginning of a program segment is received by processor 34. An example of such computer-readable data includes the captioning of the audio track for the hearing-impaired, which is often broadcast in conjunction with television programming. In this embodiment, the processor scans the computer-readable data and generates and transmits marking signals based on the computer-readable data. This may be done in an automated fashion, such as by having the processor scan the associated text looking for the data that describes the beginning and ending of commercial breaks. Alternatively, the processor may automatically scan the text, or an operator may read the text, looking for keywords and phrases that are likely to signal locations for marking signals. In addition, in cases where a text stream associated with the broadcast is not available, the processor employs speech recognition algorithms to construct text that represents the words being spoken in the broadcast. The processor, or an operator, uses this derived text tract to develop marking signals.

The marking signal can, therefore, be any signal that provides information supplemental to the broadcast programming signal. The depicted system 10 employs the marking signal to modify the broadcast programming signal to provide a proprietary program signal for the individual viewer. Marking signals can carry information on content, to allow screening of violent scenes, to allow deleting of time-outs in sport shows, or to allow editing of shows to show only highlights.

In most instances, the monitoring station (i.e., the operator/editor location) will be receiving the broadcast signal, or the programming material, from a different source than the user. For instance, a monitoring station may be monitoring a nationally-shown program that is received by the monitoring station from a local cable system, while users in other parts of the country may be receiving this same program through a number of different sources, which include a broadcast by a network affiliate, satellite TV, cable or the Internet. As a result, the programming material may be received at different times by the monitoring station and the user's system. Time shifting would be a particularly common occurrence if the monitor and user were in different time zones. In addition to a time-shifting difference between the monitor's and user's versions of the same programming, the material, or programming content itself, might differ as it may have been modified by the editing of material or the insertion of different advertisements by either the monitor's or user's broadcaster.

Because the monitoring station and user may receive the same broadcast material at different times and may receive modified or different broadcast material there would be a need to synchronize the marking signals produced by the monitor with the content stored and viewed by the user. In most circumstances, synchronization is achieved by simply having the user's system send a signal to the monitoring station. This signal identifies the network, cable channel or other broadcast source, and the program being buffered by using one of the common program identification systems, such as the numerical guides published in many newspapers and TV guides. Marking signals sent from the monitoring station are associated with specific times relative to the beginning of a program. Content stored in the buffer would also be marked with the time of recording, thereby allowing the marking signals to be applied to the same location in the content stream that was reviewed in the monitoring station when the marking signal was created. The user's processing unit (i.e., processor) is also programmed with the respective time zones of the user and the monitoring station and will make adjustments accordingly if there is "apparent" time-shifting due to the fact that the user's and the monitor's system clocks are set differently.

In cases where there is a time shift, other than an apparent time-zone shift, between the content received by the user and that received by the monitoring station, a synchronization process other than one referencing the beginning of the program would be needed. In cases where the program as seen by the user is shifted to a different time slot from the one that the monitoring station saw, the time values associated with each marking signal are shifted in a similar manner.

Another way to accomplish synchronization is to match samples of the content stored in the buffer with content associated with specific marking signals. One implementation of this method would use the communication system 38 to send with each marking signal data representative of a specific frame of video (or a specific amount of audio broadcast time) associated with that marking signal. This data, or "fingerprint," includes graphical data representing the entire frame, a sequence of frames, subsets of one or more frames, or the results of a "hashing algorithm" that would produce unique data as a function of the frame's or frames' content, but would not necessarily replicate any or all of the frame's or frames' data. Thus, a hashing algorithm might multiply the number of red, blue, and green pixels in a frame to produce a unique identifying value or set of values associated with the frame or frames. These values would then be matched against values derived in the same way from the buffered content to determine exactly where in the buffered content the marking signal applies.

In another example, the broadcaster itself, instead of an editor at the monitoring station, may generate marking signals as a means of increasing the utility of the programming signal being broadcast. These marking signals may be embedded in the programming signal itself either by using unused bandwidths, such as the vertical blanking channel in the case of a TV broadcaster, or by overlaying the marking signal data directly on the programming signal. The processor 34 would be able to decouple the marking signals from the programming signal, thereby allowing the marking signals to be used in the same way as if they had been communicated from the editing unit 42. Alternatively, the broadcaster may send the marking signals to the user in a different broadcast, on a different channel, over the Internet or in a number of different manners and provide a means to synchronize the marking signals with the associated broadcast.

In the case of broadcaster-embedded marking signals, the broadcaster may not wish commercials to be deleted or skipped in the viewing process, and therefore may produce marking signals representative of information that prevents portions of the broadcast programming signal from being skipped or deleted. In this case, the marking signal may include a blocking signal, which instructs the processor that a particular portion of the broadcast programming signal may not be deleted or skipped. The blocking signal may also prevent a user from proceeding to the next portion of the broadcast programming signal until after a predefined segment of the broadcast programming signal has been viewed. The predefined segment of the broadcast programming signal may be any portion of the broadcast programming signal. For instance, the broadcaster may mark commercials so that they cannot be deleted from the broadcast programming signal. Alternatively, the broadcaster may mark the broadcast programming signal so that the user cannot skip to another marked segment of the broadcast programming signal until after a commerical has been viewed.

In another embodiment of the invention, the broadcaster allows users to pay to skip or delete portions of the broadcast programming signal, such as commercials, for example. Upon such payments, the user's processor is adapted to remove the blocking signal from the marking signal so as to allow for the skipping and deletion of a segment of the broadcast programming signal denoted by the blocking signal, such as a commercial, for example. In another embodiment the user receives credits for watching and not skipping commercials. Such credits could, for example, then be used to buy the ability to remove blocking signals received in connection with subsequent programs.

In a similar embodiment, a broadcaster allowes a user to pay additional fees to receive premium program content. In this embodiment, the blocking signal is representative of information preventing the viewing of segments of the broadcast programming signal denoted by the blocking signal. The processor of a user who does not pay fees for the premium program makes it obligatory that the program skip over the premium segments of the broadcaster's programming signal. In this embodiment, the processor is adapted, upon of a fee, to remove the blocking signal from the marking signal, thereby allowing viewing of the segments of the broadcast programming signal denoted by the blocking signal.

The apparatus of this embodiment may further include a data interface for coupling to a source of computer-readable data, which is representative of information suitable for viewing on a television monitor. This computer-readable data may include a menu of program segments, each corresponding to a particular marking signal. The computer-readable data may also include program segment information. This program segment information may include the total length of the broadcast programming signal, the length of the segment, the type (i.e., topic) of the segment, or comments on the segment. The comments may include a brief description of the segment, or a quality rating of the segment, as generated by the editor or broadcaster. The comments may also include those of prior viewers of the program segment. Viewers of the program segments may transmit their comments to the editor's location, and the editor may then transmit those comments to subsequent viewers. Program segment information may also include other information pertinent to the program segment, such as relevant URLs, sports statistics, etc.

Information on the total length of the buffered broadcast programming signal or particular segment may be used to determine the time remaining for the programming signal or segment. A processor in this embodiment of the invention is coupled to the data interface and determines the time remaining in a program segment or a total broadcast programming signal based on this program segment information. The processor can calculate the length of the portion of the total broadcast programming signal or the length of the program segment that has been viewed and subtract this number from the total length of the buffered broadcast programming signal or program segment. The processor then generates a time remaining signal, which can be used to display to the user the time remaining in the total buffered broadcast programming signal or in a particular program segment. The time remaining may appear, for example, on the television screen while the user is viewing a television program. This information may be displayed in a number of graphical fashions, including a bar graph of time elapsed and time remaining.

When viewing any information, such as comments, or related URLs that are associated with a marking signal, the processor allows the user to halt playback of the broadcasted program content while viewing of the program segment information occurs. In an alternative embodiment, the processor allows for simultaneous viewing of the broadcast programming signal and the program segment information by continuing to play the broadcast program content in one part of the video monitor, while the program segment information is viewed in another part of the monitor, such as by using a "picture in a picture" display technique.

In another embodiment, program segment information associated with the marking signals, such as comments or related URLs, is "pushed" to the user, that is, downloaded along with all other marking signals. Alternatively, the availability of the program segment information is presented by marking signal, but the user is required to "pull," or access, the information in order to view it. The program segment information is stored by the broadcaster or editing unit 42 and is retrieved by the user as needed via communication system 38.

In this embodiment, the processor may include a search program for searching the broadcast programming signal and/or the computer-readable data for the occurrence of a selected search term. In one embodiment, the search program usees speech recognition software to search for the selected term in the audio portion of the program segment. Alternatively, it searches the text stream associated with a video portion of the program segment, or it searches the computer-readable data for the occurrence of the search term. The processor then displays that portion of the program proximate to the searched word or phrase.

Finally in this embodiment, a processor for use in an apparatus of the invention may include a selection control program which generates signals based on user-specified selections. This signal directs the receiver to receive and the buffer to store user-specified broadcast programming signals. In this embodiment, the user selects a specific broadcast program for storing in the buffer. If the apparatus includes more than one tuner, the selection control program is used to instruct the apparatus to receive and store more than one program simultaneously. Alternatively, the user may select a schedule for receiving and storing of broadcast programs. For example, the user may instruct the apparatus to receive and store a broadcast program each time it is aired weekly, daily, etc. Finally, the selection control program may be used to monitor user selections and generate a program selection signal representative of user preferences as expressed over a period of time. The selection control program may then direct the apparatus to receive and store broadcast programs in response to the program selection signal. For example, the selection control program may generate a program selection signal that directs the apparatus to receive and store a program that airs every Wednesday at 8:00 p.m. based on a history of user selections of this program.

Figure 2:
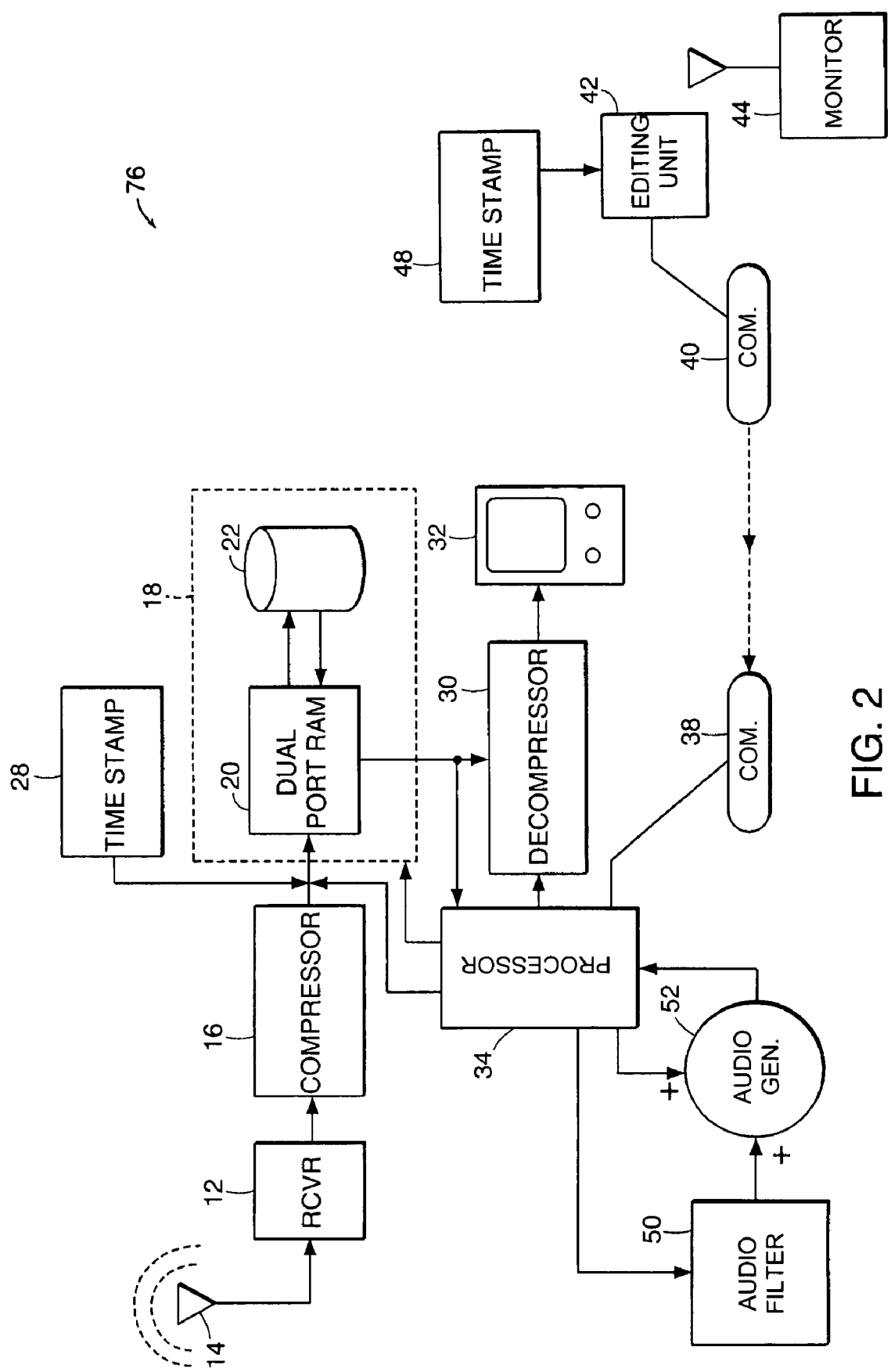
FIG. 2 is a functional block diagram of a further embodiment of the invention having an audio filter for removing an audio track from a broadcast programming signal.

FIG. 2 depicts an alternative embodiment of the present invention that includes a processor 34 that connects via a transmission path to an audio filter 50 and an audio generator 52. In this embodiment, the editing unit 42 can generate a marking signal representative of an instruction to remove the audio track of the broadcast programming signal and to dub in an alternative audio track to accompany the video portion of the compressed broadcast programming signal. In this embodiment, the editing unit 42 generates a marking signal that includes the instruction to delete the existing audio track and dub in a new audio track. In this embodiment, the editing unit 42 provides the communication system 40 with a data signal that represents computer-readable audio track information, typically a new audio track. The communication system 38 is capable of receiving the marking signal with the data signal and providing the marking signal to the processor 34.

The depicted audio filter 50 can be a digital filter that implements a notch filter for removing the audio sub-carrier, typically set as 4.5 megahertz for the NTSC broadcast standard constructed to well known principles in the art of digital signal processing and which are described in Oppenheim, et al. "Digital Signal Processing" (1975).

The depicted audio generator 52 can be a digital signal integrator device that mixes a new audio signal with the filtered broadcast programming signal to generate a new composite signal having the dubbed in audio track and the original video track. Consequently, a web site can provide a new audio track for sports programs. Further, the web site can display, or link to displays, where sport scores or commentary are available, and the processor can display the web site, responsive to the marking signal, during commercials, or at other intervals. The audio generator 52 can be an electrical circuit card assembly, a circuit card containing an FM or AM tuner, or can be a computer software module executing on the processor 34 and constructed according to well known principles in the art of digital signal processing. It will be apparent to one of ordinary skill in the art of electrical and computer engineering that alternative systems and processes for over dubbing the audio track of a broadcast programming signal can be practiced with the invention without departing from the scope thereof.

Accordingly, the systems, and methods of the invention provide composite programming signals. These composite programming signals can include audio tracks delivered over the Internet. Similarly, the image of the web site that provides the audio track can also be provided to the processor and displayed during commercials or other program segments, in response to the marking signal. Further, the marking signal can instruct the processor to show, during commercials or other segments, other users or sites, or to show data such as sport scores, a television guide, stock prices, news reports, or selected advertisements. The data to be mixed with the broadcast programming signal can be collected by agent software modules during broadcasts of the show. The agent software modules can search sources of data, including the Internet, to find computer-readable data suitable for display on the monitor. Optionally, these agents can operate responsive to user-preferences to collect information of interest to the individual viewers. Additionally, the marking signal can instruct the processor to modify the broadcast programming signal to include a banner, or a window, that displays stock prices, sport scores, e-mail, or other such information along with the broadcast signal.

Figure 3:
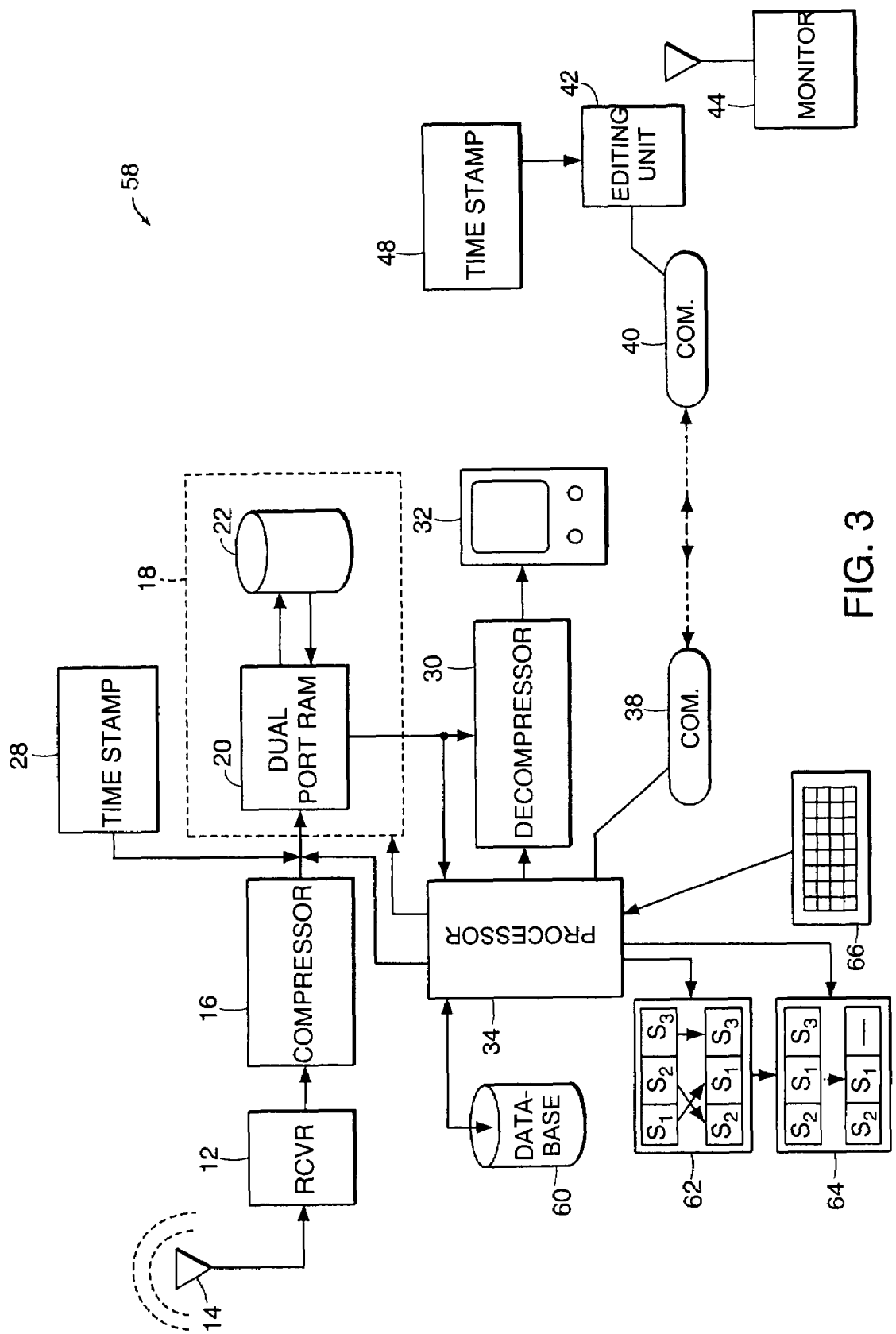
FIG. 3 is a functional block diagram depicting a system according to the invention that includes a segment filter for removing portions of a broadcast programming signal and that further includes an input device and a bi-directional communication system for communicating input data to a remote site.

FIG. 3 depicts a further alternative embodiment of the present invention that includes a processor 34 that connects via a transmission path to a database memory 60, and that connects via a transmission path to a segment processor 62 which connects via a transmission path to a segment filter 64 which connects back to the processor 34. FIG. 3 further depicts a keyboard input device 66 that connects to the processor 34.

The database memory 60 depicted in FIG. 3 can be a computer hard disc memory of the type commonly used for providing persistent storage of computer readable data. The database memory 60 can provide the processor 34 with a storage medium for storing data signals employed by the processor 34 when editing the contents of the memory system 18. In one embodiment, the database memory 60 stores topic data signals, each of which are representative of a user preferred topic. For example, the topic signals can represent keywords of interest, including the names of sport teams, news topics, company names, and other such topic information. In this embodiment, the processor 34 can have a selection controller process module that can be a software module that provides the processor 34 with a user selectable edit signal representative of data for modifying the broadcast programming signal stored in the memory system 18. For example, the database memory 60 can store user selected topic data signals that represent user preferred topics. In this embodiment, the edit unit 42 can generate a marking signal that provides topic codes and priority codes for segments of the broadcast programming signal. The processor 34 can retrieve from database memory 60 topic data signals and priority data signals that have been entered by a system user though keyboard 66 to denote topics of importance and the relative priority levels of the denoted topics.

In some embodiments, the processor 34 further includes a viewing control program, which monitors user viewing habits and generates a topic data signal or priority data signal based on those viewing habits. The viewing control program notes what types of programs, such as sports, financial news, etc., the user watches and generates topic data signals representative of the user preferred topics for storage in the database memory 60. In another embodiment, the viewing control program also notes user priority levels and what portions of the broadcast programming signal are generally deleted or skipped by the viewer and stores these preferences in database memory 60 as priority data signals. The processor 34 then retrieves the data signals compiled by the viewing control program and stored in the database memory 60 to automatically generate a proprietary program signal from later received broadcast programming signals.

In another embodiment, the viewing control program generates a viewing log based on the viewing habits of the viewer. This viewing log is formatted and displayed to the user. This feature would allow parents to monitor the viewing habits of their children, for example. Alternatively, the processor generates a viewing log signal, which is transmitted to the editor's location. The editor then uses this information to understand which marking signals were of most interest to the viewer and to generate marking signals for subsequent broadcast programs. Alternatively, the processor 34 transmits the topic data signal or priority data signal to the editor's site, where the viewing log is then generated.

The processor 34 can activate the selection controller to compare the topic data signals stored in database 60 with the topic codes provided by the marking signal, and thereby identify segments of the broadcast programming signal that contain information on topics selected by the user. Furthermore, the selection processor can employ the priority data signal to rank, and playback, the segments of the broadcast programming signal in an order that follows the priority levels selected by the system user.

In the embodiment of FIG. 3, the processor 34 connects via a transmission path to the depicted segment processor 62 The depicted segment processor 62 can be a circuit card assembly or a software module that operates responsive to instructions from the processor 34 to reorder the segments of the stored broadcast programming signal. Accordingly, the processor 34 can employ the segment processor 62 to reorder the sequence of the segments of the broadcast programming signal to put the segments in an order that is a function of the topic data signals and priority data signals entered by the users. Accordingly, the processor 34 can employ the segment processor 62 to reorder segments of the stored broadcast programming signal so that topics of high priority to the user are reordered to be presented to the user early in the program, and topics of less interest or topics not selected by the user are placed toward the end of the program signal.

As further depicted in FIG. 3, the processor 34 can connect via a transmission path to the segment filter 64. The processor 34 can instruct the segment processor 62 to pass the reordered segments of the broadcast programming signal to the segment filter 64. The processor 34 can also instruct the segment filter 64 to delete certain segments of the stored broadcast programming signal. In one embodiment, the segment filter couples to a database of segment identification signals each being representative of known segments that can occur in a broadcast programming signal, such as a commercial, opening credits, or other such segment. The segment filter 64 compares characteristics of the segments to the segment identification signals to identify a known segment and delete it or edit it accordingly. One such system for identifying known segments of a broadcast program is described in U.S. Pat. No. 4,843,562 issued to Kenyon et al. The reordered and edited broadcast programming signal can be transmitted to the processor 34 and sent to the decompressor unit 30 for display on the video monitor 32.

In another embodiment, the processor 34 instructs the segment processor 62 to delete segments of the program, particularly those related to news programming, which marking signals have indicated to be redundant with other segments that arrive later, thus freeing up additional disc storage space for further recording. The marking signal indicates that a second, later broadcasted and recorded program segment is redundant with a first, earlier broadcasted and previously buffered program segment, and instructs the segment processor 62 to delete the recorded segment that is least important. The segment that is "least important" is determined by an algorithm which matches each segment to a user's specified preferences. The "least important" segment may be a second, later stored segment of a broadcast programming signal that is redundant with a first, earlier stored segment of a broadcast programming signal. The marking signal may therefore instruct the segment processor 62 to delete the second segment from the stored broadcast programming signal given the redundancy between the two segments. As marking signals relating to a segment will typically arrive after the segment has begun to be buffered and compressed by compressor 16, the processor 34 also deletes, when necessary, partially buffered segments as the processor is informed via the marking signals that the segment being buffered, or recently buffered, does not a match a desired user topic. In this manner all undesired segments can be deleted before viewing begins, thus allowing greater use of storage space.

Figure 4:
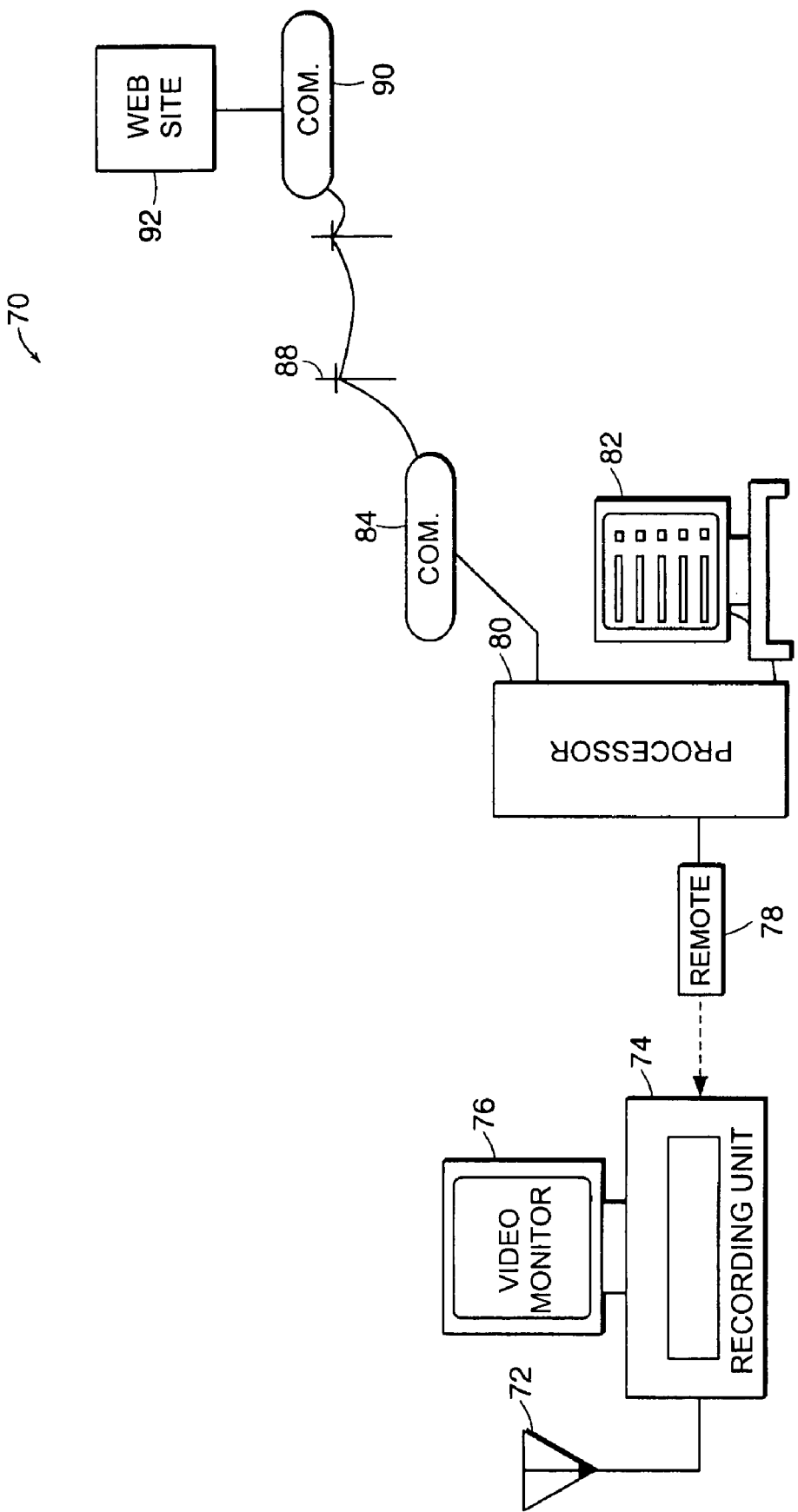
FIG. 4 is a functional block diagram of a further alternative embodiment of the invention that includes a recorder element for buffering a broadcast programming signal.

FIG. 4 depicts a further alternative embodiment of the invention. More specifically, FIG. 4 depicts an antenna 72 for receiving a broadcast programming signal, a receiver and recording system 74 for receiving and recording a broadcast programming signal, a video monitor 76, a remote control 78, a processor 80, a processor monitor 82, a communication system 84, PSTN 88, remote communication system 90, and an editing unit 92.

The depicted antenna 72, receiver and recording unit 74, and monitor 76 can be a conventional VCR unit connected to a television set. The VCR unit can act as a receiver and a buffer unit that stores on a conventional VCR recording tape signal representative of the broadcast programming signal being monitored. The VCR unit 74 includes a remote control receiver unit that responds to a remote control signals to control the reception and recording of broadcast programming signals. Preferably, the VCR unit 74 has a remote control unit that follows the Universal Programming Control Standard for remote control units.

FIG. 4 further depicts a processor 80 with a monitor 82 and a remote control unit 78 that couples via a transmission path to the processor 80. In a depicted embodiment, the processor 80 can be an IBM PC compatible computer system operating an application program that configures the processor to operate as the processor depicted in FIG. 4. More particularly, processor 80 can have an application program that provides an Internet connection to a remote Web site, such as the editing unit 92, that can provide a marking signal that provides instruction for modifying the broadcast programming signal being stored by the VCR unit 74.

In one embodiment, the processor 80 receives from the remote Web site editing unit 92 a marking signal that represents instructions for operating the remote control unit 78. The depicted remote control unit 78 is preferably a remote control unit that follows the Universal Programming Control Standard, and that connects as a peripheral to the processor 80. In one embodiment, the remote control unit 78 connects to the serial port of the PC compatible processor 80. The processor 80 runs an application program that controls the remote control unit 78 to generate infrared remote control signals that selectively operate the VCR unit 74.

For example, as described above, the Web site editing unit 92 can transmit a marking signal to the processor 80 that indicates a start time and a stop time for a segment of the broadcast programming signal that is to be deleted. In this embodiment, the editing unit 92 can transmit the marking signal in approximately real time to the processor 80. The processor 80 can direct the remote control unit 78 to direct the VCR 74 to stop recording the broadcast programming signal during the segment of the broadcast programming signal that is to be deleted. Similarly, the editing unit 92 can generate a marking signal that directs the processor 80 to activate a VCR unit 74 at a select time and for a select channel that corresponds with the start of a selected broadcast programming signal. The editing unit 92 can generate a marking signal that can be employed by the processor 80 to operate the remote control 78 to record automatically a selected broadcast programming signal. Accordingly, an operator at processor 80 can select from the Web site certain programs that the operator wishes to record and the Web site 92 can download a marking signal that provides instructions for controlling the recording and editing of the selected broadcast programming signal.

Figure 5:
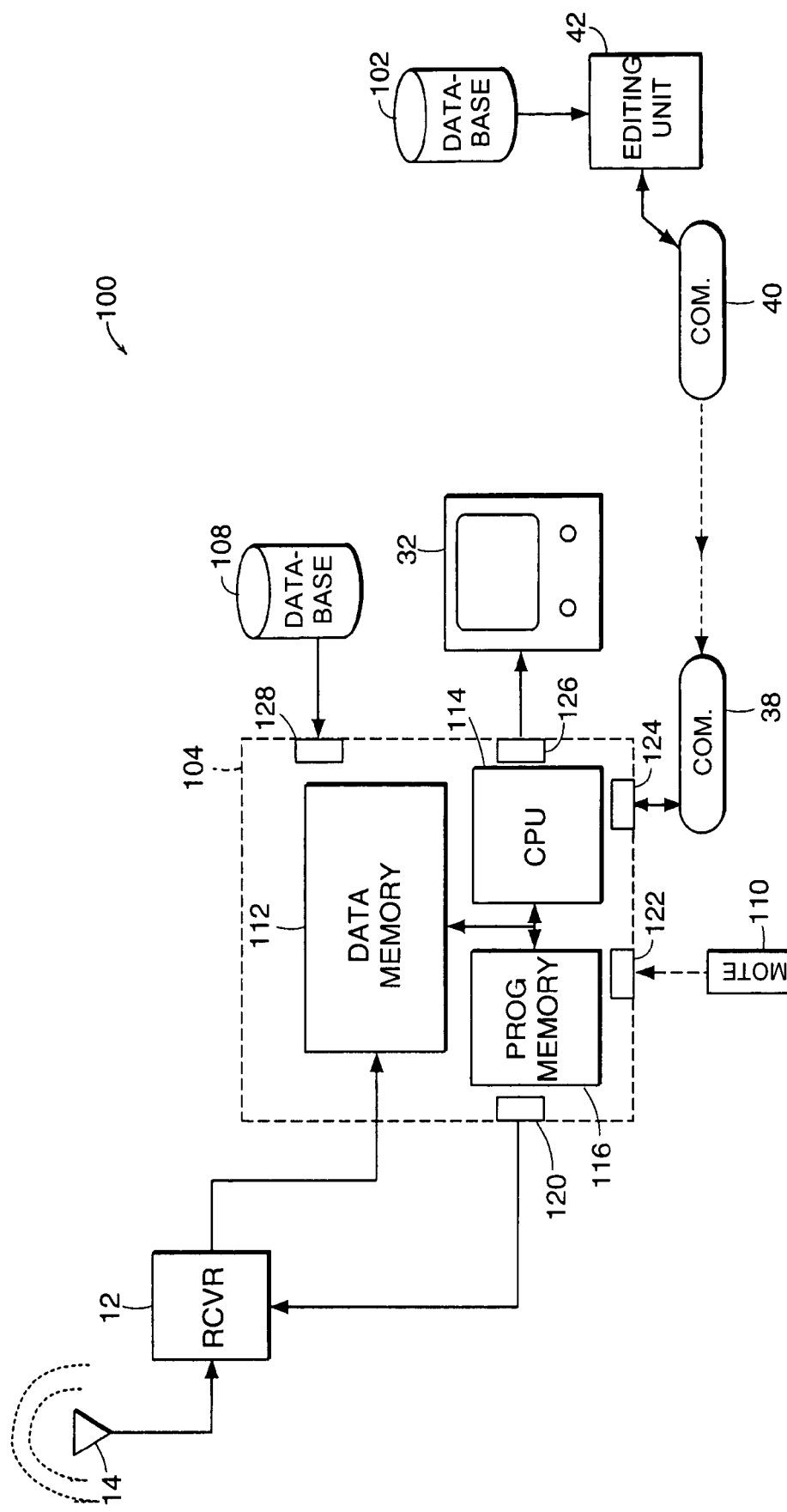
FIG. 5 is a functional block diagram of another alternative embodiment of the invention that allows a user to generate a marking signal.

FIG. 5 depicts a further alternative embodiment of the invention. In particular, FIG. 5 depicts a system 100 that includes a remote database 102 that couples to the editing unit 42. FIG. 5 further depicts a local database 108 that couples to the processor 104 that includes a data memory 112, a program memory 116, a CPU 114, a receiver interface 120, a receiver 12, communication interface 124, a monitor interface 126, and database interface 128. The process further includes a data memory 112, a program memory 116, a CPU 114, each of which is interconnected by a bus.

The depicted system 100 can generate a proprietary program signal by operation of the processor 104 that accesses a splicing processor for generating the proprietary program signal from the broadcast signal received by the receiver element 12, and from computer-readable data stored within either of the databases 108 or 102. In one embodiment of the system 100, the receiver 12 receives the broadcast programming signal and stores a copy of this signal in the data memory 112. The data memory 112 can be an electronic memory, such as the RAM memory of a computer system. In this embodiment, the receiver 12 can be a TV card peripheral device that can couple into a slot of the back plane of a personal computer to capture broadcast programming signals and to provide these broadcast programming signals to the video memory of the computer system in order that the video signals be displayed on the monitor of the device. Accordingly, the receiver 12 provides a continuous source of broadcast programming signals to the splicing processor 104.

The splicing processor 104 is depicted in FIG. 5 as a computer system that includes a program that executes on the computer system to direct a computer to splice together broadcast programming signals with other data in response to a marking signal received by that program. In this embodiment, the computer program can be any sequence of executable computer instructions loaded within the program memory 116 of the splicing processor 104. The program can direct the CPU 114 to manipulate the data stored in the data memory 112 and to collect further data from the local database 108 and/or the remote database 102. Accordingly, in one aspect, the invention can be understood as a computer program that operates a conventional computer system to act as a splicing processor that can interface into a receiver for receiving a broadcast programming signal, as well as the marking interface for receiving a marking signal, and to a data interface for coupling to a source of computer-readable data. In this aspect, the computer program directs the CPU 114 to implement a series of editing steps to edit video data stored in the data memory 112. The edited data can represent a composite programming signal that is developed as a proprietary programming signal for display at the monitor 32.

In one embodiment, the system 100 employs the local database 108 to store data signals representative of video and audio information that can be accessed by the splicing processor 104 to edit the video and audio data stored in data memory 112 to provide a composite signal. In one practice, the splicing processor 104 can operate responsive to a marking signal to generate a composite proprietary program signal that removes an indicated program segment, such as a sequence of commercials, and replaces it with a video signal, such as a screen saver image, stored within the local database 108. Further, the splicing processor 104, as described above, can remove the audio track of the broadcast programming signal stored in data memory 112 and replaces is with an alternative audio track, such as background music track, to provide a source of background music during a commercial sequence.

The system 100 can receive the marking signal, from the editing unit 42. Alternatively, the system 100 includes a remote control unit 110 and a remote receiver 122 for allowing the user to provide a marking signal to the splicing processor 104. For example, remote control unit 110 can be employed by the user to generate a signal that directs the splicing processor to replace the broadcast programming signal information in the data memory 12 with data from the local database 108. Optionally, the remote control unit 110 can further direct the splicing processor to provide on the monitor 32 an image of a menu for selecting different sources of data that are suitable for being displayed on the monitor 32. Moreover, the remote control unit 110 can operate as a conventional remote control unit 110 for directing the splicing processor 104 to, via receiver interface 120, instruct the receiver 112 to change the channel being monitored and thereby provide an alternate broadcast programming signal. Alternatively, the system 100 can employ a marking signal generating at the editing unit 42, as described above, for directing the splicing processor 104 to modify the broadcast programming signal, both by replacing data stored in the data memory 112 with alternate data, as well as by controlling the channel selection by operating the receiver interface 120 to direct the receiver 12 to receive a particular channel.

In the system 100 depicted in FIG. 5, the splicing processor 104 can further include a signal processor that couples to the marking interface for processing a broadcast programming signal to detect an occurrence of a pre-defined program segment and to generate a marking signal in response to that detected occurrence. In one embodiment, the signal processor is a video processor that detects changes in scenes, for example, by analyzing the video signals to detect a series of blacked-out images indicating a change of scenes. In this embodiment, a marking signal, and hence a marking interface, are not required to modify the broadcast programming signal. The splicing processor 104 can employ the detection of a change of scenes as an equivalent to a marking signal for editing the broadcast programming signal. In another embodiment, the signal processor can couple to an identification signal memory that stores a segment identification signal that represents characteristic information of a pre-defined program segment. In one practice of this embodiment, the local database 108 stores a series of identification signals, each of which provides information that acts like a fingerprint for uniquely identifying a known program sequence, such as a commercial. One such system that can monitor an audio track to detect a known program sequence by identifying a known identification signal is described in U.S. Pat. No. 4,843,562 issued to Kenyon et al. The signal processor can employ the occurrence of a detected commercial to generate the marking signal for directing the splicing processor 104 to modify the broadcast programming signal.

Figure 6:
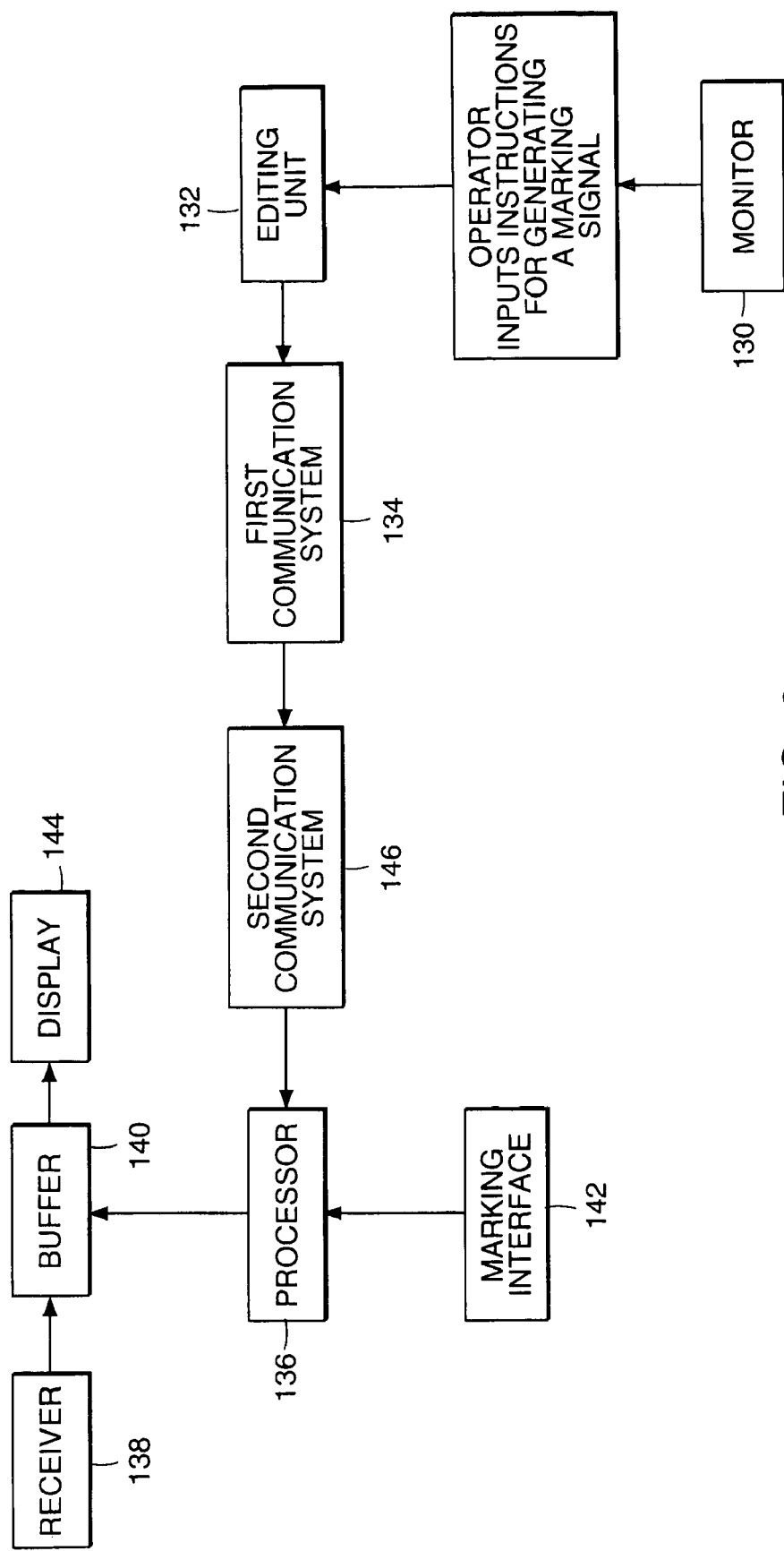
FIG. 6 is a functional block diagram of another alternative embodiment of the invention that allows a user to "surf" through a broadcast programming signal.

FIG. 6 depicts a further alternative embodiment of the invention. The apparatus of FIG. 6 includes a monitor 130 for receiving and monitoring a broadcast programming signal. At an editing unit 132, an operator generates a marking signal representative of information for modifying the broadcast programming signal. This information may include time stamps that indicate the beginning and ending of commercials, for example. The marking signal is transmitted to an end user via a first communication system 134. The apparatus of FIG. 6 also includes a receiver 138, which receives the broadcast programming signal and is coupled to buffer 140, where the broadcast programming signal is stored. The buffer may include a VCR, for example. The apparatus of FIG. 6 also includes a second communication system 146 for receiving the marking signal and a processor 136 coupled to the buffer 140 and the second communication system 146. Using marking interface 142, a user generates input data signals representative of instructions that will reference marking signals, which in turn are applied to the broadcast programming signal stored in buffer 140 as the signal is played back and displayed on display 144. The input signals may be representative of user-generated remote control instructions. These user-generated instructions direct the processor to skip to the next, previous, first or last marking signal, for example. The input signals may be in the form of infrared, radio-frequency, keyboard, or any other type of data transmission suitable for allowing a user to provide input into the system. The marking interface 142 communicates with processor 136 regarding the selection of a marking signal to be applied to the stored broadcast programming signal. The processor 136 then directs the playback of the stored signal from the buffer 140. This system therefore allows a user to manually move, or "surf," among segments of a broadcast programming signal while viewing the signal.

It will thus be seen from the above embodiments that the invention provides systems and method for computer-enhanced monitoring of broadcast programming signals. It will be understood that the invention, in one embodiment, provides computer-enhanced monitoring by receiving a marking signal that can be employed by the system for editing a broadcast programming sequence, and that further can include an interface to a source of computer-readable data which is suitable for displaying through a television or video monitor. Consequently, the systems and methods of the invention provide for editing a broadcast programming signal by deleting sections of that signal, and optionally inserting new segments into the broadcast programming signal, wherein the new segments can be drawn from this source of computer-readable information. It will be obvious to one of ordinary skill in the art that this source of computer-readable can have a varied content. It can include video and audio information. Further, it can provide interactive access by integrating video and text data, such as a web site chat room a that can be monitored by the viewer and optionally accessed by the viewer in real time. Moreover, the computer data selected for being integrated with the broadcast programming signal can be selected for each viewer's individual preferences. As described above, agent software modules can be employed by the invention to gather data that is understood as being compatible with the viewer's preferences and for providing this gathered data as a source of computer-readable data that can be stored in a local or remote database for access by the systems according to the invention to provide a source of data for employment when modifying the broadcast programming signal. It will be apparent to those of ordinary skill in the art that modifications, additions, and subtractions can be made to the above-described invention without departing from the scope thereof. Similarly, it will be understood that the invention described herein is not limited to the embodiments disclosed and described above, but is to be understood by the claims which follow.

What is claimed is:

1. Apparatus for deriving a modified program signal from a broadcast programming signal transmitted for reception by an audience and for presenting said modified program signal to an individual, said apparatus comprising, in combination:

an editing unit for generating, as a function of said broadcast programming signal, marking signals each of which includes information specifying the location of a corresponding program segment of said broadcast programming signal;

a first communication system coupled to said editing unit for transmitting said marking signals;

a receiver for receiving said broadcast programming signal;

a random access buffer memory coupled to said receiver for persistently storing a representation of said broadcast programming signal as a stored broadcast programming signal;

a second communication system for receiving said marking signals from said first communication system;

a monitor for presenting a program signal to an individual;

an input device operable by said individual for generating an instruction for selecting a specified one of said marking signals; and a processor coupled to input device and said random access buffer memory for selectively jumping to and delivering to said monitor that program segment within said stored broadcast programming stored in said random access buffer memory that corresponds to said specified one of said marking signals.

2. The apparatus of claim 1 wherein said input device is a remote control device operated by said individual.

3. The apparatus of claim 1, wherein said receiver comprises two or more tuners for receiving and storing multiple broadcast programming signals in said buffer simultaneously.

4. The apparatus of claim 1, wherein said second communication system for receiving said marking signals, said receiver for receiving said broadcast programming signals, and said buffer are located at a shared server which delivers the program content on demand to said monitor in response to said input device.

5. The apparatus of claim 1, wherein said second communication system is a point-to-point communication device.

6. The apparatus of claim 5, wherein said point-to-point communication device is a cellular telephone.

7. The apparatus of claim 1, wherein said editing unit includes a time reference signal generator for generating time stamp signals and wherein said information specifying the location of a corresponding program segment of said broadcast programming signal includes a time stamp signal from said time reference signal generator representative of the start time of one of said a program segments of said broadcast programming signal.

8. The apparatus of claim 7, wherein said information specifying the location of a corresponding program segment further includes a time stamp signal from said time reference signal generator representative of the ending time of said one of said a program segments of said broadcast programming signal.

9. The apparatus of claim 7, wherein said information specifying the location of a corresponding program segment further includes a signal representative of a program identification system.

10. The apparatus of claim 9, wherein said program identification system is a numerical guide.

11. The apparatus of claim 7, wherein said first communication system is further adapted for receiving said signal representative of a program identification system and for transmitting one of said marking signals in response thereto.

12. The apparatus of claim 7, wherein said receiver further includes a second time reference signal generator for generating time stamp signals which are stored at predetermined intervals to form a time based index into said stored broadcast programming signal in said random access buffer memory.

13. The apparatus of claim 7, wherein said buffer is further for marking said stored broadcast programming signal with a marker representative of a time of recording of said stored broadcast programming signal.

14. The apparatus of claim 13, wherein said processor is further for matching said time stamp signal in said marking signal with said marker, thereby synchronizing said stored broadcast programming signal with said marking signal specifying the location of a corresponding program segment.

15. The apparatus of claim 1, wherein said information including the location of corresponding program segments in said broadcast programming signal comprises a frame of video of said broadcast programming signal.

16. The apparatus of claim 15, wherein said second communication system is further for transmitting a signal representative of a program identification system.

17. The apparatus of claim 16, wherein said program identification system is a numerical guide.

18. The apparatus of claim 16, wherein said first communication system is further adapted for receiving said signal representative of a program identification system and for transmitting one of said marking signals in response thereto.

19. The apparatus of claim 18, wherein said second communication system is further for receiving said one of said marking signals including said frame of video of said broadcast programming signal.

20. The apparatus of claim 19, wherein said processor is further for matching said one of said marking signals including said frame of video of said broadcast programming signal with the corresponding frame of video of said stored broadcast programming signal, thereby synchronizing said stored broadcast programming signal with said one of said marking signals.

21. The apparatus of claim 1, wherein said processor comprises a selection control program for generating a signal representative of a user-specified program selection for receiving and storing a broadcast programming signal in said random access buffer memory.

22. The apparatus of claim 21, wherein said selection control program is further for monitoring said user-specified selection and generating a program selection signal representative of said user-specified program selection.

23. The apparatus of claim 1, wherein said processor comprises a viewing control program for monitoring user viewing habits and generating a viewing log of said broadcast programming signal viewed by said user.

24. The apparatus of claim 1, wherein said processor comprises a viewing control program for monitoring user viewing habits and generating a topic data signal representative of user preferences based on said viewing habits.

25. The apparatus of claim 24, wherein said processor further comprises a database memory for storing said topic data signal.

26. The apparatus of claim 1, wherein said processor comprises a viewing control program for monitoring user viewing habits and generating a priority data signal representative of user priority preferences based on said viewing habits.

27. The apparatus of claim 26, wherein said processor further comprises a database memory for storing said priority data signal.

28. The apparatus of claim 26, wherein said processor further comprises a segment processor, responsive to said priority data signal, for ordering segments of said stored broadcast programming signal according to said viewing habit.

29. The apparatus of claim 1, further comprising a data interface for coupling to a source of computer-readable data, said computer-readable data being representative of information suitable for viewing on said monitor.

30. The apparatus of claim 29, wherein said computer-readable data is representative of a beginning of a program segment.

31. The apparatus of claim 30, wherein at least one of said marking signals is generated based on said computer-readable data.

32. The apparatus of claim 29, wherein said computer-readable data comprises a menu of program segments, a beginning of each of said program segments corresponding to a particular one of said marking signals.

33. The apparatus of claim 32, wherein said computer-readable data further comprises information describing one of said program segments.

34. The apparatus of claim 33, wherein said processor is further for halting playback of said stored broadcast programming signal during viewing of said information describing one of said program segments.

35. The apparatus of claim 33, wherein said processor provides simultaneous viewing on said monitor of said stored broadcast programming signal and said program segment information.

36. The apparatus of claim 33, wherein said processor is coupled to said data interface and is adapted for determining time remaining in a program segment or a total broadcast programming signal based on said program segment information and is adapted for generating a time remaining signal.

37. The apparatus of claim 32, wherein said processor comprises a search program for searching said stored broadcast programming signal and/or said computer-readable data for the occurrence of a selected search term.

38. The apparatus of claim 1, wherein said processor further comprises a segment processor for deleting a second of said program segments in response to said marking signal, said marking signal indicating a said second segment of said stored broadcast programming signal that is redundant with a first segment of said stored broadcast programming signal.

39. A method of generating a proprietary program signal, comprising the steps of:

(a) generating a first marking signal, including a blocking signal representative of information for preventing the selection of a second marking signal until after a predefined segment of a broadcast programming signal has been viewed; and (b) transmitting said marking signal to a remote location, whereby a user who receives said broadcast programming signal and said marking signals at said remote location is prevented from selecting said second marking signal until after a predefined segment of said broadcast programming signal denoted by said first marking signal has been viewed.

40. An apparatus for generating a proprietary program signal, comprising:
(a) an editing unfit for generating, as a function of said broadcast programming signal, a first marking signal, including a blocking signal representative of information for preventing the deletion of a specified segment of said stored broadcast programming signal, representative of information for modifying said broadcast programming signal;
(b) a first communication system coupled to said sting unit for transmitting said marking signal;
(c) a receiver for receiving said broadcast programming signal;
(d) a buffer coupled to said receiver comprising a random access memory for persistently storing said broadcast programming signal as a stored broadcast programming signal;
(e) a second communication system for receiving said marking signal from said first communication system; and
(f) a processor coupled to said buffer and said second communication system for modifying said stored broadcast programming signal in response to said marking signal.

41. The apparatus of claim 40, wherein said processor is further for removing said blocking signal from said marking signal, thereby allowing deletion of said stored segment of said broadcast programming signal.

42. The apparatus of claim 40, wherein said blocking signal is representative of information for preventing the viewing of a segment of said stored broadcast programming signal.

43. The apparatus of claim 42, wherein said processor is further for removing said blocking signal from said marking signal, thereby allowing viewing of said segment of said stored broadcast programming signal.

44. The apparatus of claim 40, wherein said blocking signal is representative of information for preventing the selection of a second marking signal until after a predefined segment of said stored broadcast programming signal has been viewed.

45. The apparatus of claim 40, further comprising a marking interface coupled to said processor for receiving input signals representative of user-generated instructions for selection of a marking signal for use in modifying said stored broadcast programming signal.

46. The apparatus of claim 45, wherein said user-generated instructions are user-generated remote control instructions.

47. The apparatus of claim 1, wherein said buffer is located remotely from said monitor and is selected from the group consisting of a digital video disc, a compact disc or other media storage, an Internet server, and a cable broadcast server.

* * * * *